US012601216B2

(12) United States Patent
Vukovic et al.

(10) Patent No.: US 12,601,216 B2
(45) Date of Patent: Apr. 14, 2026

(54) SYSTEMS AND METHODS FOR CONTROLLING VEHICLE COMPONENT OPERATION BASED ON USER DEVICE MOVEMENT PATTERN

(71) Applicant: Ford Global Technologies, LLC, Dearborn, MI (US)

(72) Inventors: Ivan Vukovic, Birmingham, MI (US); Jean de Dieu Mutangana, Detroit, MI (US); Sathyanarayana Chary Palakonda, Northville, MI (US); Bradley G. Hochrein, Dexter, MI (US)

( * ) Notice: Subject to any disclaimer, the term of this patent is extended or adjusted under 35 U.S.C. 154(b) by 94 days.

(21) Appl. No.: 18/595,111

(22) Filed: Mar. 4, 2024

(65) Prior Publication Data

US 2025/0277401 A1 Sep. 4, 2025

(51) Int. Cl.
*E05F 15/76* (2015.01)
*E05F 15/77* (2015.01)

(52) U.S. Cl.
CPC .............. *E05F 15/76* (2015.01); *E05F 15/77* (2015.01); *E05Y 2900/546* (2013.01); *E05Y 2900/55* (2013.01)

(58) Field of Classification Search
CPC .... E05F 15/76; E05F 15/77; E05Y 2900/546; E05Y 2900/55
See application file for complete search history.

(56) References Cited

U.S. PATENT DOCUMENTS

| | | | | |
|---|---|---|---|---|
| 11,230,260 | B2 * | 1/2022 | Ahmed | H04W 4/80 |
| 11,313,159 | B2 | 4/2022 | Bussis et al. | |
| 11,827,179 | B2 | 11/2023 | Oman | |
| 2013/0275008 | A1 * | 10/2013 | Breed | E05F 15/73 701/49 |
| 2016/0055696 | A1 * | 2/2016 | Lee | G07C 9/28 340/5.61 |
| 2017/0232932 | A1 * | 8/2017 | Nishidai | B60R 25/2054 340/5.61 |

(Continued)

OTHER PUBLICATIONS

Markus Staeblein, NXP Semiconductors, Digital Car Keys: What is the Deal?, https://www.nxp.com/company/blog/digital-car-keys-what-is-the-deal:BL-DIGITAL-KEYS-WHAT-IS-THE-DEAL, Dec. 6, 2022, pp. 1-5.

(Continued)

*Primary Examiner* — Brandon D Lee
(74) *Attorney, Agent, or Firm* — Joseph Zane; Eversheds Sutherland (US) LLP

(57) ABSTRACT

A vehicle including a detection unit and a processor is disclosed. The detection unit may be configured to receive a position information from a user device in proximity to the vehicle. The processor may be configured to determine that the user device may be moving in a predefined pattern in proximity to the vehicle based on the position information. The processor may further determine that the vehicle may be in a first vehicle operational state, of a plurality of vehicle operational states, responsive to determining that the user device may be moving in the predefined pattern in proximity to the vehicle. The processor may additionally perform a first operation on a first vehicle component responsive to determining that the vehicle may be operating in the first vehicle operational state. The first vehicle component may be associated with the first vehicle operational state.

20 Claims, 5 Drawing Sheets

(56) References Cited

U.S. PATENT DOCUMENTS

| | | | | |
|---|---|---|---|---|
| 2020/0130702 | A1* | 4/2020 | Ferreira | H04W 4/48 |
| 2022/0242370 | A1* | 8/2022 | Oman | B60R 25/25 |
| 2023/0234537 | A1 | 7/2023 | Kramar et al. | |

OTHER PUBLICATIONS

David Schnaufer, Ultra-Wideband and CCC® Digital Key—Enabling a Better Driving Experience, Qorvo Inc., https://www.qorvo.com/design-hub/blog/ultra-wideband-and-ccc-digital-key-enabling-a-better-driving-experience, Mar. 2, 2023, pp. 1-2.

* cited by examiner

SYSTEMS AND METHODS FOR CONTROLLING VEHICLE COMPONENT OPERATION BASED ON USER DEVICE MOVEMENT PATTERN

FIELD

The present disclosure relates to systems and methods for controlling a vehicle component operation based on a user device movement pattern in proximity to the vehicle.

BACKGROUND

There may be instances when a user may desire to operate a vehicle component in a hands-free manner, when the user's hands may be pre-occupied. For example, the user may desire to close an open vehicle door or an open vehicle rear closure without actuating any vehicle button, when the user may be carrying one or more objects in the user's hands or when the user may be located some distance away from the vehicle. Currently, there are limited means available that may enable a user to conveniently close an open vehicle door or an open vehicle rear closure in a hands-free manner.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
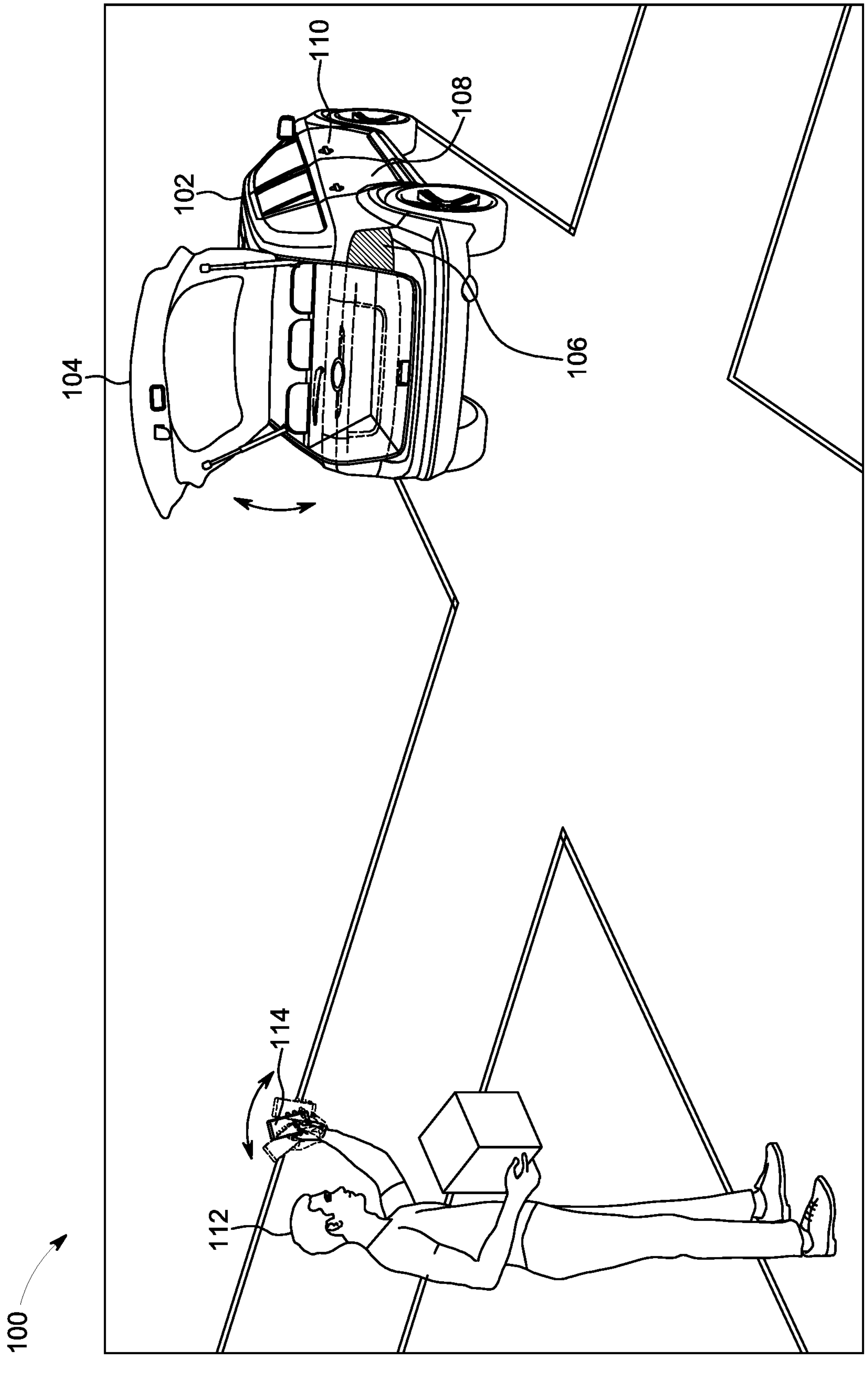
FIG. 1 depicts an example environment in which techniques and structures for providing the systems and methods disclosed herein may be implemented.

The present disclosure describes a vehicle that may be configured to control operation of one or more vehicle components based on a user device movement in proximity to the vehicle. The user device may be communicatively coupled with the vehicle, and may be associated with a vehicle user. The user may control operation of one or more vehicle components in a hands-free manner (i.e., without touching the vehicle component and/or any dedicated button on the vehicle or the user device) by moving the user device in a predefined pattern, which may be detected by the vehicle.

In some aspects, the vehicle may determine that the user device may be moving in the predefined pattern in proximity to the vehicle by performing Ultra-wideband (UWB) ranging based on UWB signals obtained from the user device. Responsive to determining that the user device may be moving in the predefined pattern, the vehicle may determine a user device movement pattern characteristic (or "pattern characteristic" or "pattern context" associated with the user device movement) and/or a vehicle operating state. The vehicle may further control the operation of one or more vehicle components based on the pattern characteristic and/or the vehicle operating state. In some aspects, the vehicle may perform different actions/operations associated with different vehicle components for the same user device movement in proximity to the vehicle, based on the vehicle operating state. For example, the vehicle may automatically close a vehicle rear closure when the rear closure may be open and a user waves the user device in proximity to the vehicle. As another example, the vehicle may automatically switch OFF a vehicle front light when the front light may be switched ON and the user waves the user device in proximity to the vehicle. In this manner, the same user device movement pattern may result in different vehicle operations, based on the vehicle's operational state.

In some aspects, the pattern characteristic may include/indicate information (e.g., an operating state) associated with a vehicle component that may be closest to the user device, when the user device moves in the predefined pattern in proximity to the vehicle. For example, if the user device moves in the predefined pattern in proximity to a vehicle rear closure, the pattern characteristic may indicate a rear closure operating state (e.g., open or close state). When the pattern characteristic indicates that the rear closure may be in an open state, the vehicle may automatically close the rear closure when the user device moves in the predefined pattern, thereby enabling the user to close the rear closure in a hands-free manner.

In further aspects, the pattern characteristic may include/indicate information (e.g., the operational state) associated with a vehicle component towards which the user device may be pointed, when the user device moves in the predefined pattern in proximity to the vehicle. For example, if the user device may be pointed towards the rear closure or vehicle front lights, the pattern characteristic may indicate a state of the rear closure or the vehicle front lights. In this case also, when the pattern characteristic indicates that the rear closure may be in the open state or the vehicle front lights may be illuminated, the vehicle may automatically close the rear closure or switch off the vehicle front lights when the user device moves in the predefined pattern.

In additional aspects, the vehicle may control the vehicle component operation based on a vehicle component state or a vehicle operational state as described above. For example, if a vehicle infotainment system may be outputting music (e.g., indicating a "first vehicle operational state") when the user device moves in the predefined pattern in proximity to the vehicle, the vehicle may automatically turn off the music from the infotainment system. As another example, if the rear closure may be in an open state (e.g., indicating a "second vehicle operational state") when the user device moves in the predefined pattern in proximity to the vehicle, the vehicle may automatically close the rear closure. The vehicle may additionally control the vehicle component operation based on a predefined mode (e.g., a car-wash mode, a drive-thru mode, etc., or a "third vehicle operational state") in which the vehicle may be operating, when the user device moves in the predefined pattern in proximity to the vehicle. The vehicle may additionally control operations of two or more vehicle components simultaneously, when the user device moves in the predefined pattern in proximity to the vehicle and when the vehicle may be operating in the third vehicle operational state.

The present disclosure discloses a vehicle that may enable a user to control operation of one or more vehicle components in a hands-free manner. The vehicle does not use or require any external hardware to implement the operation as disclosed in the present disclosure, and uses existing vehicle UWB transceivers to facilitate the user in controlling the vehicle component operation in a hands-free manner. The vehicle further controls the vehicle component operation based on a current "context" of the user device movement and/or the vehicle when the user moves the user device in the predefined pattern, thereby controlling the vehicle component operation in a manner relevant and advantageous to the user.

These and other features of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as a car, a work vehicle, a crossover vehicle, a truck, a van, a minivan, a taxi, a bus, etc. The vehicle 102 may be a manually driven vehicle, and/or may be configured to operate in a partially autonomous mode, and may include any powertrain such as a gasoline engine, one or more electrically-actuated motor(s), a hybrid system, etc.

The vehicle 102 may include a plurality of vehicle components including, but not limited to, a rear closure 104, rear lights 106, rear vehicle doors 108, a passenger vehicle door 110, front lights (shown as vehicle front lights 402 in FIG. 4), and/or the like. In some aspects, the vehicle 102 may be configured to enable a vehicle user/operator (e.g., a user 112) to control operation of one or more vehicle components in a hands-free manner. Stated another way, the vehicle 102 may enable the user 112 to control the operation of one or more vehicle components without actuating any vehicle button. In this manner, the user 112 may control the vehicle component operation even when the user 112 may be located some distance away from the vehicle 102 and/or when one or both of user's hands may be pre-occupied (e.g., carrying groceries, boxes, objects, etc.), as shown in FIG. 1. In the exemplary aspect depicted in FIG. 1, the user 112 is shown to be controlling the operation of the rear closure 104 (specifically, closing an open rear closure) in a hands-free manner; however, the present disclosure is not limited to such an aspect. The user 112 may control the operation of other vehicle components in a hands-free manner as well, without departing from the present disclosure scope.

In some aspects, the user 112 may be carrying a user device 114 that may be communicatively coupled with the vehicle 102. The user device 114 may be, for example, a mobile phone (which may include Phone as a Key (PaaK) feature), a key fob, a wearable device with an Ultra-wideband (UWB) transceiver, a UWB tag or any other communication device with a UWB transceiver. The user 112 may be configured to control the operation of one or more vehicle components by moving the user device 114 in a predefined pattern in proximity to the vehicle 102. The user device movement in proximity to the vehicle 102 may be monitored/tracked/detected by one or more vehicle UWB transceivers (shown as UWB transceivers 234 in FIG. 2) associated with the vehicle 102, which may perform UWB ranging by communicatively coupling with the UWB transceiver(s) associated with the user device 114. Specifically, the vehicle UWB transceivers may be configured to detect a real-time position of the user device 114 relative to the vehicle 102 based on signals obtained from the UWB transceiver(s) associated with the user device 114. Responsive to detecting the real-time user device position in proximity to the vehicle 102 over a predefined time duration, the vehicle 102 may determine the user device movement pattern based on the real-time user device position. For example, the vehicle 102 may determine that the user 112 may be waving the user device 114 based on the real-time user device position detected by the vehicle UWB transceivers over the predefined time duration. Responsive to determining the user device movement pattern, the vehicle 102 may compare the determined user device movement pattern with the predefined pattern (information of which may be pre-stored in a vehicle memory, shown as memory 242 in FIG. 2), and control operation of one or more vehicle components when the determined user device movement pattern matches with the predefined pattern.

In this manner, the vehicle 102 may enable the user 112 to control operation of one or more vehicle components by performing a predefined action with the user device 114 (e.g., by moving the user device 114 in the predefined pattern). The predefined pattern may be known to the user 112, and hence the user 112 may move the user device 114 in the predefined pattern whenever the user 112 desires to control operation of one or more vehicle components. Further, in some aspects, the predefined pattern may be customizable by the user 112. For example, the user 112 may provide inputs to the vehicle 102 (e.g., via the user device 114 or a vehicle Human-Machine Interface (HMI)) during a vehicle "set-up phase" to indicate that when the user 112 waves the user device 114 two times over a time duration of two seconds, the vehicle 102 should understand that the user 112 is moving the user device 114 in the predefined pattern and hence the vehicle 102 should understand that the user 112 desires to control the operation of one or more vehicle components. The example of the predefined pattern described herein should not be construed as limiting, and the user 112 may set other types of predefined patterns without departing from the present disclosure scope. In other aspects, one or more predefined patterns may be preset by a vehicle manufacturer, and information associated with the predefined patterns may be stored in the vehicle memory.

In further aspects, the same predefined pattern of user device movement may be associated with control of different vehicle components. For example, in a certain vehicle or user device movement context, waving the user device 114 may close the rear closure 104 when the rear closure 104 may be open (e.g., when the vehicle 102 may be operating in a "first vehicle operational state"); and in another vehicle or user device movement context, the same action of waving the user device 114 may cause a vehicle exterior light to move from an illuminated state to an unilluminated state (e.g., when the vehicle 102 may be operating in a "second vehicle operational state"). Stated another way, the vehicle 102 may perform a first operation (e.g., close the rear closure 104) on a first vehicle component (i.e., the rear closure 104)

when the vehicle 102 may be operating in the first vehicle operational state and the user device 114 moves in the predefined pattern in proximity to the vehicle 102. On the other hand, for the same user device movement in the predefined pattern in proximity to the vehicle 102, the vehicle 102 may perform a second operation (e.g., cause the vehicle exterior light to move from the illuminated state to the unilluminated state) on a second vehicle component (i.e., the vehicle exterior light) when the vehicle 102 may be operating in the second vehicle operational state. The first vehicle operational state may be associated with the first vehicle component, i.e., the rear closure 104, and the second vehicle operational state may be associated with the second vehicle component, i.e., the vehicle exterior light. A person ordinarily skilled in the art may appreciate from the examples described above that, for the same predefined pattern of user device movement, the second vehicle operational state may different from the first vehicle operational state, and the second vehicle component may be different from the first vehicle component. In this manner, the vehicle 102 enables the user 112 to control operation of different vehicle components with the same pattern of user device movement (depending on the vehicle context or operational state).

In some aspects, to determine which vehicle component the user 112 may desire to control the operation of, the vehicle 102 may determine a "context" or "operational state" of the vehicle 102 and/or the user gesture when the user 112 moves the user device 114 in the predefined pattern. Stated another way, responsive to determining that the user device 114 may be moving in the predefined pattern, the vehicle 102 may determine a "pattern characteristic" associated with the user device movement pattern and/or a vehicle operational state, from a plurality of vehicle operational states. The vehicle 102 may then determine the vehicle component(s) that the user 112 may desire to control the operation of, based on the pattern characteristic associated with the user device movement pattern and/or the determined vehicle operational state. Responsive to determining the vehicle component, the vehicle 102 may automatically modify a state of the vehicle component or perform operation on the vehicle component, thereby enabling the user 112 to control the vehicle component operation in a hands-free manner (i.e., without requiring to touch the vehicle component or actuate any vehicle or user device button/actuator). Examples of the pattern characteristic associated with the user device movement pattern and the vehicle operational state are briefly described below and described in detail in conjunction with FIG. 2. The examples described below are for illustrative purpose, and should not be construed as limiting.

In a first exemplary aspect, the pattern characteristic associated with the user device movement pattern may include information or operating state associated with a vehicle component (e.g., a third vehicle component) closest to the user device 114 when the user 112 moves the user device 114 in the predefined pattern. In some aspects, the vehicle 102 may determine the vehicle component closest to the user device 114 based on the signals obtained from the UWB transceiver associated with the user device 114 and a 3-Dimensional (3D) vehicle geometry that may be pre-stored in the vehicle memory. Further, responsive to determining the vehicle component closest to the user device 114, the vehicle 102 may determine the information associated with the vehicle component, which may include, for example, a current operating state of the determined vehicle component (e.g., whether the vehicle component may be open or closed, activated or inactivated, etc.). The vehicle 102 may then automatically change the operating state of the determined vehicle component, thereby enabling the user 112 to control the vehicle component operation in a hands-free manner. As an example, as shown in FIG. 1, if the vehicle component closest to the user device 114 may be the rear closure 104 and the rear closure 104 may be in the open state, the vehicle 102 may automatically close the rear closure 104 when the user 112 moves the user device 114 in the predefined pattern. As another example (shown in FIG. 4 and described in detail later), if the vehicle component closest to the user device 114 may be the vehicle front lights and the vehicle front lights may be in an activated state (i.e., in an illuminated state), the vehicle 102 may automatically turn the vehicle front lights to an unilluminated state when the user 112 moves the user device 114 in the predefined pattern.

In a second exemplary aspect, the pattern characteristic associated with the user device movement pattern may include information or operating state associated with a vehicle component (e.g., the third vehicle component) towards which the user 112 may be pointing the user device 114 when the user 112 may be moving the user device 114 in the predefined pattern. For example, if the user 112 may be pointing the user device 114 towards the rear closure 104 when the user 112 may be moving the user device 114 in the predefined pattern, the vehicle 102 may determine that the user 112 may desire to control operation of the rear closure 104. In this case also, the vehicle 102 may determine that the user 112 may be pointing the user device 114 towards the rear closure 104 based on the signals obtained from the UWB transceiver associated with the user device 114 and the 3D vehicle geometry. Similar to the first exemplary aspect described above, in this case also, responsive to determining the vehicle component towards which the user 112 may be pointing the user device 114, the vehicle 102 may determine the information associated with the vehicle component, which may include, for example, the operating state of the determined vehicle component, and may then automatically change the vehicle component state, as described above.

In a third exemplary aspect, the vehicle operational state may include an operational state of one or more vehicle components. For example, the vehicle operational state may include a rear closure state (e.g., the first vehicle operational state) that may indicate whether the rear closure 104 may be open or closed, a vehicle infotainment system state that may indicate whether a vehicle infotainment system (shown as infotainment system 236 in FIG. 2) may be outputting music/sound or is in a silent state, a vehicle exterior or interior light state (e.g., the second vehicle operational state) that may indicate whether the vehicle exterior or interior lights may be illuminated or be in an unilluminated state, and/or the like. In this case, the vehicle 102 may determine the vehicle component (e.g., first or second vehicle component) that the user 112 may desire to control when the user 112 moves the user device 114 in the predefined pattern by determining the vehicle component that may be in an open or an activated state. Responsive to determining such a vehicle component, the vehicle 102 may cause the vehicle component to move to a closed or an inactivated state when the user 112 moves the user device 114 in the predefined pattern. For example, if the rear closure 104 (e.g., the first vehicle component) may be in the open state (i.e., in the first vehicle operational state), the vehicle 102 may cause the rear closure 104 to automatically close (i.e., perform a first operation) when the user 112 moves the user device 114 in the predefined pattern. As another example, if the vehicle infotainment system may be outputting music, the vehicle 102 may cause the vehicle infotainment system to stop playing music when the user 112 moves the user device 114 in the predefined pattern.

In a fourth exemplary aspect, the vehicle operational state may include or indicate one or more predefined modes (e.g., a third vehicle operational state/mode) in which the vehicle 102 may be operating. In this case, the vehicle 102 may determine the vehicle component that the user 112 may desire to control when the user 112 moves the user device 114 in the predefined pattern based on information associated with the predefined mode/third vehicle operational state in which the vehicle 102 may be operating. For example, if the vehicle 102 may be operating in a drive-thru mode, the vehicle 102 may determine the vehicle components to be vehicle windows (e.g., a fourth vehicle component) and the vehicle infotainment system based on the information associated with the drive-thru mode that may be pre-stored in the vehicle memory. In this case, responsive to determining that the vehicle 102 may be in the drive-thru mode, the vehicle 102 may automatically cause the vehicle windows to move down and the vehicle infotainment system to stop playing music when the user 112 moves the user device 114 in the predefined pattern. A person ordinarily skilled in the art may appreciate from the example described above that in this case, the vehicle 102 may control operation of two vehicle components simultaneously (i.e., the vehicle windows and the vehicle infotainment system) when the user 112 moves the user device 114 in the predefined pattern. As another example, the vehicle 102 may cause the vehicle windows (e.g., the fourth vehicle component) to move up and the vehicle lights (e.g., the second vehicle component) to switch off when the vehicle 102 may be in a car-wash mode and the user 112 moves the user device 114 in the predefined pattern.

Further vehicle details are described below in conjunction with FIG. 2.

Although the description above describes an aspect where UWB communication protocol is used to detect the user device position and the user device movement pattern in proximity to the vehicle 102, the present disclosure is not limited to such an aspect. In additional or alternative aspects, one or more other wireless communication protocols such as Bluetooth®, BLE®, Wi-Fi, near-field-communications (NFC), Radio-Frequency Identification (RFID), and/or the like, may be used to detect the user device position and the user device movement pattern in proximity to the vehicle 102.

The vehicle 102 and/or the user 112 implement and/or perform operations, as described here in the present disclosure, in accordance with the owner manual and safety guidelines. In addition, any action taken by the user 112 based on recommendations or notifications provided by the vehicle 102 should comply with all the rules specific to the location and operation of the vehicle 102 (e.g., Federal, state, country, city, etc.). The recommendation or notifications, as provided by the vehicle 102, should be treated as suggestions and only followed according to any rules specific to the location and operation of the vehicle 102.

Figure 2:
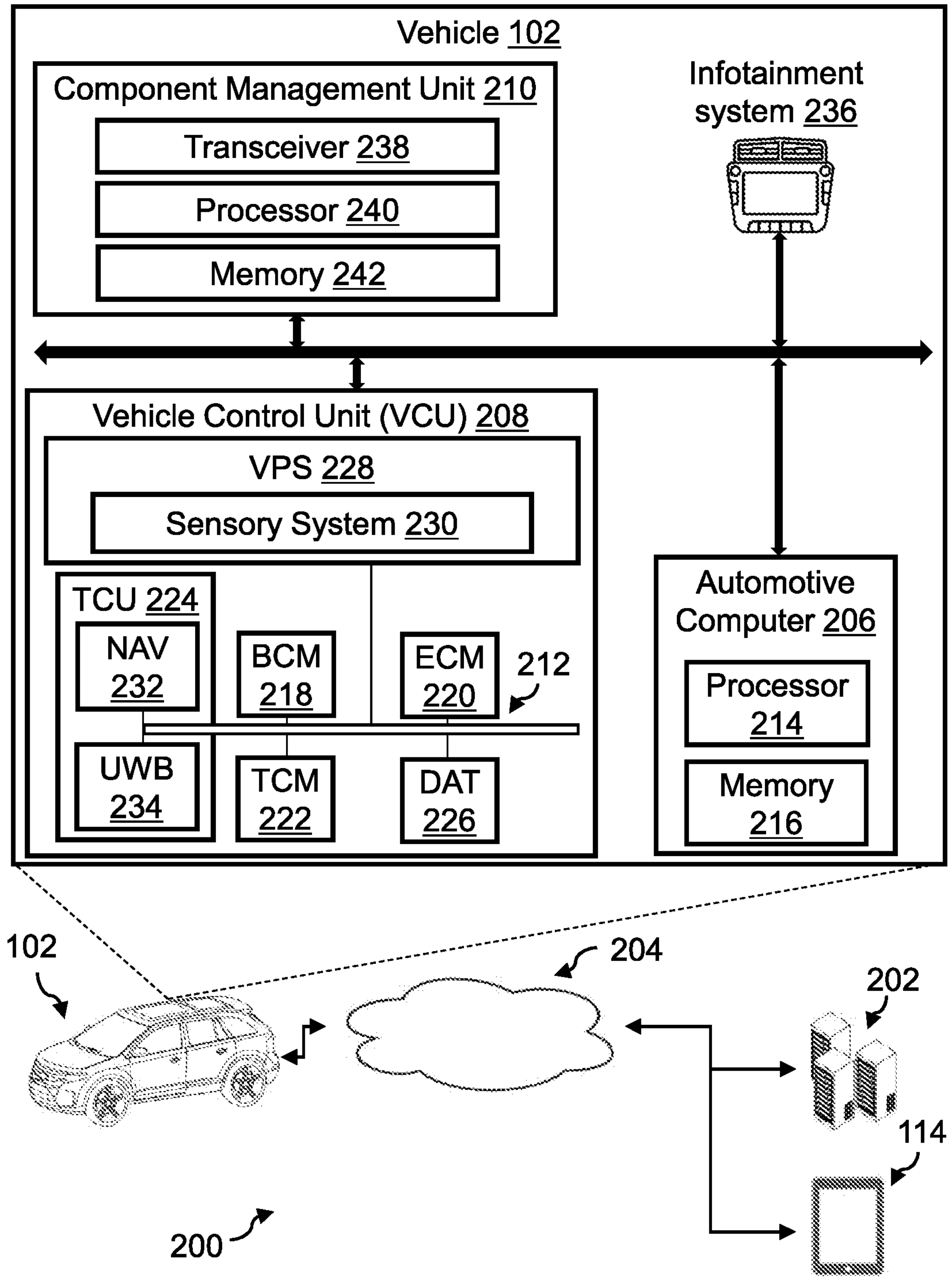
FIG. 2 depicts a block diagram of an example system for controlling operation of a vehicle component in accordance with the present disclosure.

FIG. 2 depicts a block diagram of an example system 200 for controlling operation of a vehicle component in accordance with the present disclosure. While describing FIG. 2, references may be made to FIGS. 3 and 4.

The system 200 may include the vehicle 102, the user device 114 and one or more servers 202 (or server 202) that may be communicatively coupled with each other via one or more networks 204 (or network 204). The server 202 may be part of a cloud-based computing infrastructure and may be associated with and/or include a Telematics Service Delivery Network (SDN) that provides digital data services to the vehicle 102, and other vehicles (not shown) that may be part of a vehicle fleet. In further aspects, the server 202 may store and provide to the vehicle 102 information associated with the 3D geometry associated with the vehicle 102, information associated with a plurality of predefined modes (or predefined operating modes) associated with the vehicle 102, and/or the like.

The network 204 illustrates an example communication infrastructure in which the connected devices discussed in various embodiments of this disclosure may communicate. The network 204 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 206, a Vehicle Control Unit (VCU) 208, and a component management unit 210 (or unit 210). The VCU 208 may include a plurality of Electronic Control Units (ECUs) 212 disposed in communication with the automotive computer 206.

In some aspects, the automotive computer 206 and the unit 210 may be disposed anywhere in the vehicle 102, in accordance with the disclosure. The automotive computer 206 may be or include an electronic vehicle controller, having one or more processor(s) 214 and a memory 216.

The processor(s) 214 may be in communication with one or more memory devices in communication with the respective computing systems (e.g., the memory 216 and/or one or more external databases not shown in FIG. 2). The processor (s) 214 may utilize the memory 216 to store programs in code and/or to store data for performing aspects in accordance with the disclosure. The memory 216 may be a non-transitory computer-readable memory storing a vehicle component control program code. The memory 216 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 208 may share a power bus with the automotive computer 206 and may be configured and/or programmed to coordinate the data between vehicle systems, connected servers (not shown), and other vehicles (not shown) operating as part of a vehicle fleet. The VCU 208 may include or communicate with any combination of the ECUs 212, such as a Body Control Module (BCM) 218, an Engine Control Module (ECM) 220, a Transmission Control Module (TCM) 222, a telematics control unit (TCU) 224 (or a "detection unit"), a Driver Assistance Technologies (DAT) controller 226, etc. The VCU 208 may further include and/or communicate with a Vehicle Perception System (VPS) 228, having connectivity with and/or control of one or more vehicle sensory system(s)

230. The vehicle sensory system 230 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging (LiDAR or "lidar") sensor, door sensors, proximity sensors, temperature sensors, wheel sensors, ambient weather sensors, vehicle interior and exterior cameras, steering wheel sensors, etc.

In some aspects, the VCU 208 may control vehicle operational aspects and implement one or more instruction sets stored in the memory 216.

The TCU 224 (or the detection unit) may be configured and/or programmed to provide vehicle connectivity to wireless computing systems onboard and off board the vehicle 102, and may include a Navigation (NAV) receiver 232 for receiving and processing a GPS signal, one or more UWB transceivers 234, a BLE® Module (BLEM) or BUN (BLE, UWB, NFC module, not shown), a Wi-Fi transceiver, Low-frequency antennas, remote tuner module (RTM) antennas, and/or other wireless transceivers/antennas (not shown in FIG. 2) that may be configurable for wireless communication (including cellular communication) between the vehicle 102 and other systems (e.g., the user device 114), computers, and modules. The TCU 224 may be disposed in communication with the ECUs 212 by way of a bus.

Figure 3:
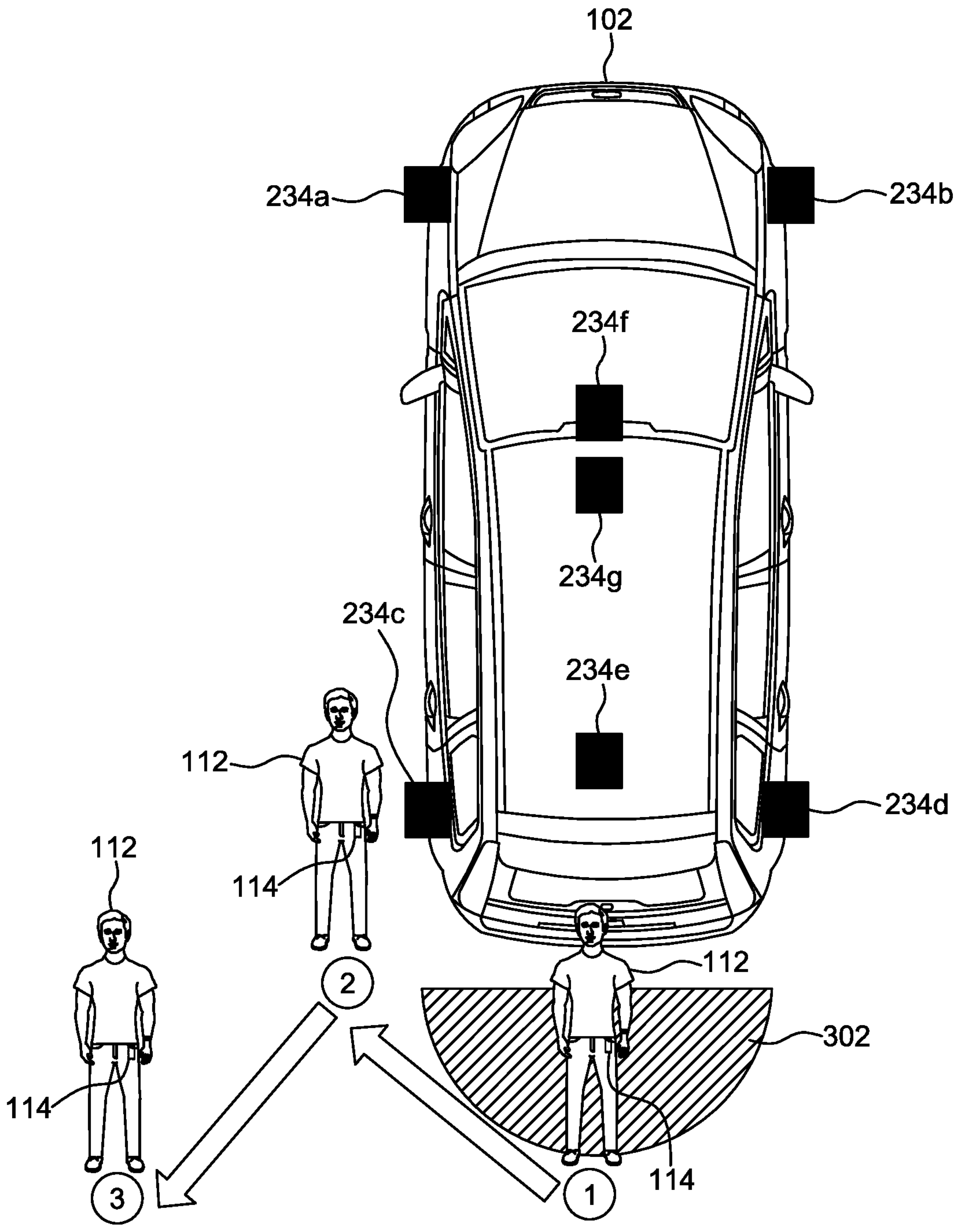
FIG. 3 depicts a first example user device movement pattern in proximity to a vehicle in accordance with the present disclosure.

In some aspects, the TCU 224, via the BUN module or the UWB transceivers 234, may be configured to detect a position of the user device 114 (or user device position) in proximity to the vehicle 102 based on signals obtained from one or more UWB transceivers (not shown) associated with the user device 114. The TCU 224 may be configured to detect the user device position in proximity to the vehicle 102 when the user device 114 may be communicatively coupled with the vehicle 102. In an exemplary aspect, the vehicle 102 may include a plurality of UWB transceivers 234 that may be located at different vehicle locations, as shown in FIG. 3. In the aspect depicted in FIG. 3, the vehicle 102 is shown to include a UWB transceiver 234*a* located at a front left vehicle portion, a UWB transceiver 234*b* located at a front right vehicle portion, a UWB transceiver 234*c* located at a rear left vehicle portion, a UWB transceiver 234*d* located at a rear right vehicle portion, a UWB transceiver 234*e* located at a rear center vehicle portion, and a BUN module/UWB transceivers 234*f*, 234*g* located at a middle center vehicle portion. The vehicle 102 may include more or less count of UWB transceivers 234, without departing from the present disclosure scope.

In some aspects, each UWB transceiver 234 may be configured to detect the user device location in proximity to the vehicle 102. Responsive to each UWB transceiver 234 detecting the user device location, the vehicle BUN module or one or more vehicle processors (e.g., the processor 214) or the unit 210 may correlate the user device location detected by each UWB transceiver 234 to determine a precise user device location in proximity to the vehicle 102.

The ECUs 212 may control aspects of vehicle operation and communication using inputs from human drivers, inputs from an autonomous vehicle controller, and/or via wireless signal inputs received via the wireless connection(s) from other connected devices, such as the user device 114, the server 202, among others.

The BCM 218 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, and various comfort controls. The BCM 218 may also operate as a gateway for bus and network interfaces to interact with remote ECUs (not shown in FIG. 2). In some aspects, the BCM 218 may configured to control operation of the plurality of vehicle components described above in conjunction with FIG. 1, based on command signals obtained from the unit 210.

The DAT controller 226 may provide Level-1 through Level-3 automated driving and driver assistance functionality that can include, for example, active parking assistance, vehicle backup assistance, and/or adaptive cruise control, among other features. The DAT controller 226 may also provide aspects of user and environmental inputs usable for user authentication.

In some aspects, the automotive computer 206 may connect with an infotainment system 236. The infotainment system 236 may include a touchscreen interface portion, and may include voice recognition features, biometric identification capabilities that can identify users based on facial recognition, voice recognition, fingerprint identification, or other biological identification means. In other aspects, the infotainment system 236 may be further configured to receive user instructions via the touchscreen interface portion, and/or display notifications (including visual alert notifications), navigation maps, etc. on the touchscreen interface portion.

The computing system architecture of the automotive computer 206, the VCU 208, and/or the unit 210 may omit certain computing modules. It should be readily understood that the computing environment depicted in FIG. 2 is an example of a possible implementation according to the present disclosure, and thus, it should not be considered as limiting or exclusive.

In accordance with some aspects, the unit 210 may be integrated with and/or executed as part of the ECUs 212. The unit 210, regardless of whether it is integrated with the automotive computer 206 or the ECUs 212, or whether it operates as an independent computing unit in the vehicle 102, may include a transceiver 238, a processor 240, and a computer-readable memory 242.

The transceiver 238 may be configured to receive information/inputs from one or more external devices or systems, e.g., the user device 114, the server 202, and/or the like, via the network 204. Further, the transceiver 238 may transmit notifications, requests, signals, etc. to the external devices or systems. In addition, the transceiver 238 may be configured to receive information/inputs from vehicle components such as the vehicle sensory system 230, one or more ECUs 212, the TCU 224, and/or the like. Further, the transceiver 238 may transmit signals (e.g., command signals) or notifications to the vehicle components such as the BCM 218, the infotainment system 236, and/or the like.

The processor 240 and the memory 242 may be same as or similar to the processor 214 and the memory 216, respectively. In some aspects, the processor 240 may utilize the memory 242 to store programs in code and/or to store data for performing aspects in accordance with the disclosure. The memory 242 may be a non-transitory computer-readable storage medium or memory storing the vehicle component control program code. In some aspects, the memory 242 may additionally store the information associated with the 3D vehicle geometry associated with the vehicle 102, the information associated with the plurality of predefined modes (or predefined operating modes) associated with the vehicle 102, and/or the like, which the vehicle 102 may obtain from the server 202 or may be pre-stored in the memory 242 (e.g., by the vehicle manufacturer). The memory 242 may further store information associated with a plurality of predefined user device movement patterns (or "predefined patterns") that the vehicle 102 may obtain from the user 112, the vehicle manufacturer, and/or the like. As described above in conjunction with FIG. 1, the user 112 may provide the information associated with the predefined patterns to the vehicle 102 during the vehicle set-up phase, and the information may include/indicate the user device movement patterns in which the user 112 may move the user device 114 when the user 112 desires to control operation of one or more vehicle components in a hands-free manner. In some aspects, the information associated with the predefined pattern may be customizable by the user 112.

In operation, the processor 240 may first authenticate the user device 114 when the user device 114 may be located in proximity to the vehicle 102 (e.g., within a predefined distance of the vehicle 102). In some aspects, the processor 240 may authenticate the user device 114 based on authentication codes that the vehicle 102 and the user device 114 may exchange with each other (via the transceiver 238 and the transceiver associated with the user device 114) when the user device 114 may be located in proximity to the vehicle 102. The authentication codes may be pre-stored in the memory 242 and a user device memory (not shown), or may be generated in real-time and provided by the server 202 to the vehicle 102 and the user device 114. In alternative aspects, the processor 240 may authenticate the user device 114 by using any other known authentication method, without departing from the present disclosure scope.

Responsive to authenticating the user device 114, the processor 240 may communicatively couple the user device 114 with the vehicle 102 (specifically with the TCU 224). In some aspects, the TCU 224 (or the detection unit) may commence to detect, via the UWB transceivers 234, the user device position in proximity to the vehicle 102 when the user device 114 may be communicatively coupled with the vehicle 102. Stated another way, the UWB transceivers 234 (or the BUN module) may commence to perform UWB ranging (or receive user device "position information" from the user device 114) based on UWB signals obtained from the user device 114, when the user device 114 may be communicatively coupled with the vehicle 102. The TCU 224/UWB transceivers 234 may further transmit inputs indicating the user device position to the processor 240.

The processor 240 may obtain the inputs from the TCU 224/UWB transceivers 234, and may determine the user device position in proximity to the vehicle 102 based on the inputs. The processor 240 may then monitor or track the user device position in proximity to the vehicle 102, and may determine a user device movement pattern over a predefined time duration based on the user device position. The processor 240 may further fetch the information associated with the plurality of predefined patterns from the memory 242, and may correlate the determined user device movement pattern with the information associated with the plurality of predefined patterns. The processor 240 may determine that the user device 114 may be moving in a predefined pattern in proximity to the vehicle 102 based on the correlation. Stated another way, the processor 240 may determine that the user device 114 may be moving in a predefined pattern in proximity to the vehicle 102 when the determined user device movement pattern matches with at least one of the plurality of predefined patterns.

Examples of one or more predefined patterns are depicted in FIGS. 1 and 3. Specifically, in some aspects, the processor 240 may determine that the user device 114 may be moving in the predefined pattern when the user device 114 repeatedly moves closer to the vehicle 102 and away from the vehicle 102 a predefined count of times (e.g., 2-3 times) over a first preset time duration (e.g., 1-2 seconds), as shown in FIG. 1. In this case, the user 112 may be waving the user device 114 in proximity to the vehicle 102, and the UWB transceivers 234 may capture such user device movement/positions that may be used by the processor 240 to determine that the user device 114 may be moving in the predefined pattern.

In further aspects, the processor 240 may determine that the user device 114 may be moving in the predefined pattern when the user device 114 moves from a first preset position (shown as position "1" in FIG. 3) in proximity to the vehicle 102 to a second preset position (shown as position "2" in FIG. 3) in proximity to the vehicle 102, and stays stationary in the second preset position for a second preset time duration (e.g., 2-3 seconds). In this case, the user 112 may not be required to hold the user device 114 in the user's hand, and may instead keep/store the user device 114 in user's pocket. In an exemplary aspect, the user 112 may execute or cause such user device movement when both the user's hands may be pre-occupied (e.g., carrying boxes, objects, etc.).

In some aspects, the position "1" may be known to the user 112 and may be located in a predefined zone 302 (or a "dwell zone") in proximity to the vehicle 102. In the exemplary aspect depicted in FIG. 3, the predefined zone 302 is shown to be located in proximity to a vehicle rear portion; however, the present disclosure is not limited to such a location of the predefined zone 302. The predefined zone 302 may be located at any other position in proximity to the vehicle 102, without departing from the present disclosure scope. Further, there may be more than one similar predefined zones associated with the vehicle 102.

In the exemplary aspect depicted in FIG. 3, the position "2" is shown to be located in proximity to the rear left vehicle portion (or in proximity to the UWB transceiver 234*c*). In some aspects, the predefined pattern may further include the user device 114 moving away from the position "2" (e.g., to a position "3") after staying stationary in the position "2" for the second preset time duration (which may be known to the user 112, and may also be customizable by the user 112).

In some aspects, the predefined pattern of user device movement may not be limited to linear movement only, and may also be two-dimensional movement in X-Y plane. For example, the user 112 may move the user device 114 in circles (e.g., of 1 or 2 meter diameter), and the processor 240 may determine such a user device movement as a "first movement pattern". As another example, the user 112 may move the user device 114 in a square manner around the vehicle 102, and the processor 240 may determine such a user device movement as a "second movement pattern". A person ordinarily skilled in the art may appreciate that the UWB transceivers 234 are configured to determine user device movement in X-Y plane (and not just linear movement).

The examples of the predefined patterns described above should not be construed as limiting. The user 112 may set a plurality of additional predefined patterns during the vehicle set-up phase, without departing from the present disclosure scope. In further aspects, there may be multiple user devices (not shown) that may be communicatively coupled with the vehicle 102 simultaneously. In this case, the processor 240 may operate in two modes. In a first mode, the processor 240 may determine independent user device movements and cause the vehicle 102 to perform independent operations based on each device's movement. In a second mode, the processor 240 may determine a combined movement pattern of multiple devices, and perform vehicle operation based on the combined movement pattern. In some aspects, in case of conflict between different user device movements, the processor 240 may perform a prioritization operation where a specific device's commands (e.g., the user device 114) over-rules the other devices.

Responsive to determining that the user device 114 may be moving in the predefined pattern in proximity to the vehicle 102, the processor 240 may determine a pattern characteristic associated with the user device movement pattern or the predefined pattern in proximity to the vehicle 102 and/or a vehicle operational state. The processor 240 may further control operation of or perform operation on one or more vehicle components (e.g., a "first vehicle component") based on the pattern characteristic and/or the vehicle operational state, as described above in conjunction with FIG. 1 and described below in detail.

In some aspects, the first vehicle component may be the rear closure 104, and the vehicle operational state may be the rear closure state. Specifically, the processor 240 may determine that the vehicle 102 may be operating in the first vehicle operational state when the rear closure 104 may be in the open state. In this case, responsive to determining that the user device 114 may be moving in the predefined pattern in proximity to the vehicle 102, the processor 240 may transmit a command signal to the BCM 218 to cause the rear closure 104 to automatically close (i.e., the processor 240 may perform a "first operation" on the rear closure 104) when the rear closure state indicates that the rear closure 104 may be in an open state. Stated another way, the processor 240 may cause the rear closure 104 to automatically close when the user 112 waves the user device 114 as shown in FIG. 1 or moves the user device 114 in the pattern shown in FIG. 3, and when the rear closure 104 may be in the open state. In this manner, the user 112 may cause automatic closing of the rear closure 104 in a hands-free manner, by moving the user device 114 in the predefined pattern in proximity to the vehicle 102.

Although the description above describes an aspect where the processor 240 causes the rear closure 104 to close when the user device 114 moves in the predefined pattern and when the rear closure 104 may be in the open state, however, the present disclosure is not limited to such an aspect. In some aspects, the user 112 may cause the user device 114 to move in the predefined pattern even before the rear closure 104 may be in the open state. In this case, the user 112 may move the user device 114 in the predefined pattern in proximity to the vehicle 102 even before opening the rear closure 104, when the user 112 may already be aware that the user's hands may be pre-occupied when the user 112 leaves the vehicle 102 (e.g., when the user 112 may be offloading objects from the vehicle 102).

In this exemplary aspect, the user 112 may first move the user device 114 in the predefined pattern in proximity to the vehicle 102, and then walk/travel towards the rear closure 104 (which may be in a closed state). The processor 240 may determine that the rear closure 104 is in the closed state based on the rear closure state, when the user 112 moves the user device 114 in the predefined pattern. In this case, the processor 240 may not perform any automated action associated with the rear closure 104 till the rear closure 104 is in the closed state. Instead, in this case, the processor 240 may monitor the rear closure state for a predefined time duration (e.g., 2-5 minutes) responsive to determining that the rear closure 104 is in the closed state.

When the user 112 opens the rear closure 104 within the predefined time duration, the processor 240 may determine that the rear closure state has changed from the closed state to the open state (i.e., the vehicle 102 may be operating in the first vehicle operational state). Responsive to determining that the rear closure state has changed from the closed state to the open state, the processor 240 may track the user device position (based on the inputs obtained from the UWB transceivers 234). The processor 240 may further determine that the user device 114 may have moved a predefined distance (e.g., 5 to 8 feet) away from the vehicle 102 based on the user device position (e.g., when the user 112 may have offloaded the objects from the vehicle 102 and may be walking away from the vehicle 102). Responsive to such determination, the processor 240 may cause the rear closure 104 to automatically close.

In this manner, the user 112 may cause the rear closure 104 to automatically close by moving the user device 114 in the predefined pattern even before opening the rear closure 104. In this case, the vehicle 102 "remembers" that the user device 114 has moved in the predefined pattern for the predefined time duration, and causes the rear closure 104 to automatically close if the rear closure 104 is moved to the open state within the predefined time duration. In some aspects, the processor 240 may not take any action when the rear closure 104 may not be moved to the open state within the predefined time duration. Stated another way, the vehicle 102 may "forget" that the user device 114 has moved in the predefined pattern when the rear closure 104 is not moved to the open state within the predefined time duration.

Further, as described above in conjunction with FIG. 1, the processor 240 may determine the second vehicle component (e.g., vehicle exterior lights) to control when the user device 114 may move in the same predefined pattern as described above, and when the vehicle 102 may be operating in the second vehicle operational state. In this case, the second vehicle component may be associated with the second vehicle operational state, which may be, for example, an activated operational state of the second vehicle component. As an example, the processor 240 may determine that the vehicle 102 may be operating in the second vehicle operational state when the vehicle exterior lights may be illuminated. In this case, the processor 240 may perform a second operation on the second vehicle component when the user device 114 may be moved in the predefined pattern described above and when the vehicle 102 may be operating in the second vehicle operational state. For example, in this case, the processor 240 may cause the vehicle exterior lights to move to an unilluminated state.

Furthermore, as described above in conjunction with FIG. 1, the processor 240 may control the first vehicle component operation (or the third vehicle component operation) based on the pattern characteristic associated with the user device movement pattern or the predefined pattern in proximity to the vehicle 102. In some aspects, the pattern characteristic may include information or operating state associated with a vehicle component closest to the user device 114 when the user device 114 moves in the predefined pattern. In this case, the first vehicle component (or the third vehicle component, as described above in conjunction with FIG. 1) may be the vehicle component closest to the user device 114, and the information associated with the vehicle component closest to the user device 114 may include the vehicle component's operating state (e.g., activated or inactivated state, open or closed state, etc.). As described above in conjunction with FIG. 1, the processor 240 may determine the vehicle component closest to the user device 114 when the user device 114 moves in the predefined pattern based on the UWB signals obtained from the UWB transceiver associated with the user device 114 and the 3D vehicle geometry (that may be stored in the memory 242). In some aspects, the processor 240 may correlate the user device position in proximity to the vehicle 102 with the 3D vehicle geometry, and determine the vehicle component that may be closest to the user device 114 based on the correlation.

Figure 4:
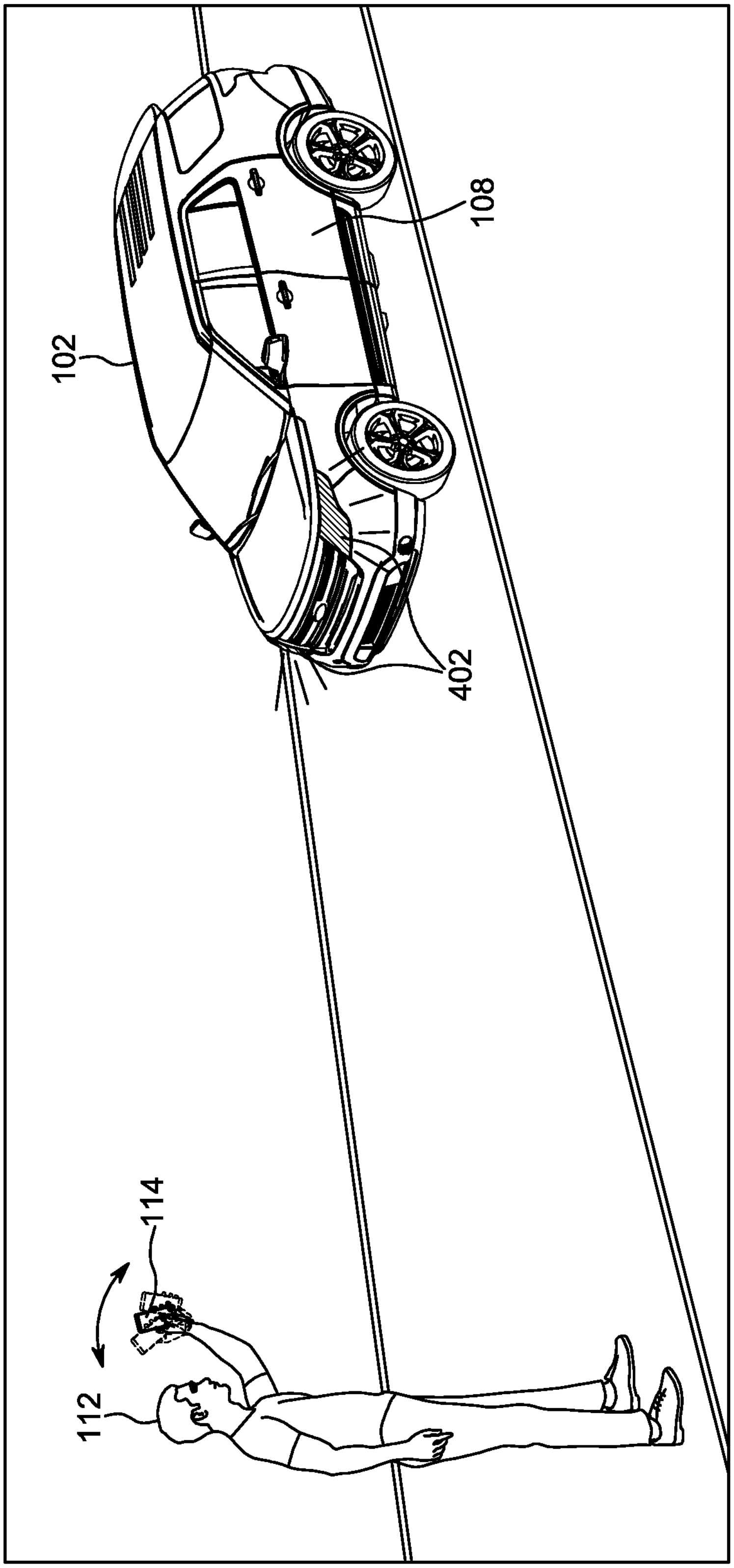
FIG. 4 depicts a second example user device movement pattern in proximity to a vehicle in accordance with the present disclosure.

Responsive to determining the vehicle component closest to the user device 114, the processor 240 may cause a change of state of the determined vehicle component (i.e., perform a "third operation" on the determined third vehicle component) when the user device 114 moves in the predefined pattern in proximity to the vehicle 102. For example, as shown in FIG. 1, if the vehicle component closest to the user device 114 may be the rear closure 104 and the rear closure 104 may be in the open state, the vehicle 102 may automatically close the rear closure 104 when the user 112 moves the user device 114 in the predefined pattern. As another example, as shown in FIG. 4, if the vehicle component closest to the user device 114 may be vehicle front lights 402, and the vehicle front lights 402 may be in an activated state (i.e., in an illuminated state), the vehicle 102 may automatically turn off the vehicle front lights 402 when the user 112 moves the user device 114 in the predefined pattern.

In further aspects, the pattern characteristic may include information or operating state associated with a vehicle component towards which the user device 114 may be pointed when the user device 114 moves in the predefined pattern. In this case, the first vehicle component (or the third vehicle component, as described above in conjunction with FIG. 1) may be the vehicle component towards which the user device 114 may be pointed when the user device 114 moves in the predefined pattern, and the information associated with the vehicle component may include the vehicle component's state (e.g., activated or inactivated state, open or closed state, etc.). In this case also, the processor 240 may determine the vehicle component towards which the user device 114 may be pointed when the user device 114 moves in the predefined pattern based on the UWB signals obtained from the UWB transceiver associated with the user device 114 and the 3D vehicle geometry (that may be stored in the memory 242).

The processor 240 may further automatically control operation of one or more vehicle components when the vehicle 102 may be operating in a predefined mode or the third vehicle operational state (as determined via the vehicle operational state) and when the user device 114 moves in the predefined pattern in proximity to the vehicle 102. In this case, the processor 240 may first determine that the vehicle 102 may be operating in a predefined mode (e.g., a drive-thru move or car-wash mode, as described above in conjunction with FIG. 1) based on the vehicle operational state, when the user device 114 moves in the predefined pattern in proximity to the vehicle 102. The processor 240 may then fetch/obtain information associated with the predefined mode from the memory 242, responsive to determining that the vehicle 102 may be operating in the predefined mode. In some aspects, the information may indicate one or more vehicle components that may be controlled (or cause to change their respective states) in the predefined mode when the user device 114 moves in the predefined pattern in proximity to the vehicle 102. For example, the information may indicate that the vehicle windows (e.g., the fourth vehicle component, as described above in conjunction with FIG. 1) should be moved down and the infotainment system 236 should stop playing music when the predefined mode may be the drive-thru mode. As another example, the information may indicate that the vehicle windows should be moved up and the vehicle interior/exterior lights (e.g., the second vehicle component, as described above in conjunction with FIG. 1) should be switched off when the predefined mode may be the car-wash mode.

Responsive to obtaining/fetching the information described above from the memory 242, the processor 240 may determine one or more vehicle components to control based on the information associated with the predefined mode. For example, the processor 240 may determine the vehicle windows ("fourth vehicle component") and the infotainment system 236 (an example first vehicle component) as the vehicle components to control when the vehicle 102 may be operating in the drive-thru mode. As another example, the processor 240 may determine the vehicle windows ("fourth vehicle component") and the vehicle lights ("second vehicle component") as the vehicle components to control when the vehicle 102 may be operating in the car-wash mode.

Responsive to determining the first/second and fourth vehicle components, the processor 240 may simultaneously control the operations of the first/second and fourth vehicle components when the user device 114 moves in the predefined pattern in proximity to the vehicle 102. Specifically, the processor 240 may change the state of the first/second and fourth vehicle components simultaneously, when the user device 114 moves in the predefined pattern in proximity to the vehicle 102. For example, the processor 240 may cause, via the BCM 218, the vehicle windows to move down and the infotainment system 236 to stop playing music when the user 112 moves the user device 114 in the predefined pattern in proximity to the vehicle 102 and the vehicle 102 may be operating in the drive-thru mode. Similarly, the processor 240 may cause, via the BCM 218, the vehicle windows to move up and the vehicle lights to be switched off when the user 112 moves the user device 114 in the predefined pattern in proximity to the vehicle 102 and the vehicle 102 may be operating in the car-wash mode.

In additional aspects, the processor 240 may be an Artificial Intelligence (AI) based processor that may "learn" the user device movement patterns associated with different vehicle users, to efficiently determine whether a user may be moving the user device 114 in the predefined pattern. A person ordinarily skilled in the art may appreciate that different users may wave the user device 114 in different manners/ways, and thus the processor 240 "learns" unique ways of user device waving (or other actions associated with the user device 114) associated with different users so that the vehicle 102 may efficiently detect that the user device 114 may be moving in the predefined pattern. For example, the processor 240 may learn the unique way a vehicle owner waves the user device 114, and also learn the unique way in which a family member of the vehicle owner waves the user device 114. Based on this learning, the vehicle 102 may perform the same action when the user device 114 is waved by the vehicle owner or the vehicle owner's family member. In this manner, the processor 240 substantially reduces a probability of incorrectly identifying or "missing" any user gesture, due to different styles adopted by different users for the same gesture.

Although the description above describes an aspect where the TCU 224 performs the function of the detection unit and the processor 240 determines whether the user device 114 is moving in the predefined pattern based on the inputs obtained from the TCU 224/detection unit, the present disclosure is not limited to such an aspect. In other aspects, the functions of the detection unit and the processor 240 may be performed by any other unit/module of the vehicle 102, or the functions of the detection unit and the processor 240 may be performed by a single unit, e.g., the BCM 218 (or any other unit/module). In this case, the BCM 218 may receive (e.g., via the TCU 224) a user device position information from the user device 114, and the BCM 218 may determine that the user device may be moving in the predefined pattern in proximity to the vehicle 102 based on the user device position information.

The units/modules described above performing the functions of detecting the position of the user device 114 in proximity to the vehicle 102 and/or determining whether the user device 114 may be moving in the predefined pattern should not be construed as limiting. The same functions, as described above, can be performed by other vehicle units/modules, without departing from the present disclosure scope.

Figure 5:
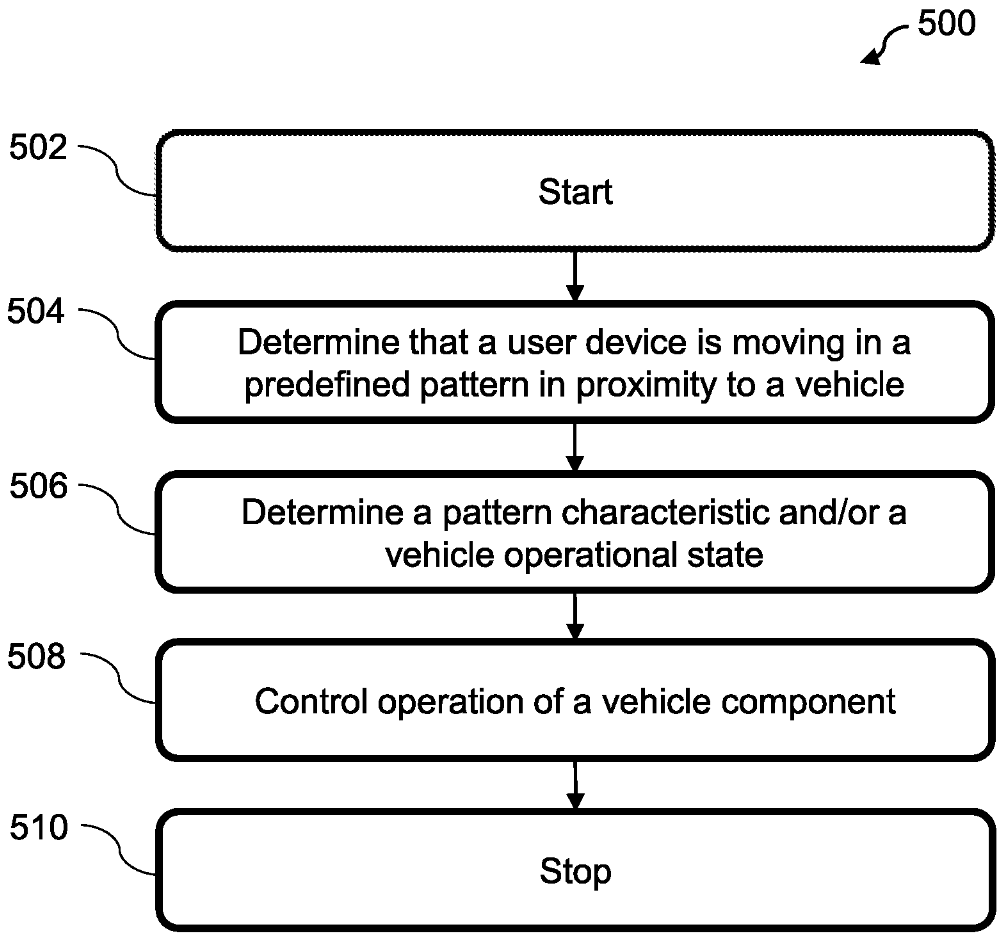
FIG. 5 depicts a flow diagram of an example method for controlling operation of a vehicle component in accordance with the present disclosure.

FIG. 5 depicts a flow diagram of an example method 500 for controlling operation of a vehicle component in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 240, that the user device 114 may be moving in the predefined pattern in proximity to the vehicle 102 based on the user device position detected by the TCU 224/UWB transceivers 234. At step 506, the method 500 may include determining, by the processor 240, that the vehicle 102 may be operating in the first vehicle operational state, from a plurality of vehicle operational states, responsive to determining that the user device 114 may be moving in the predefined pattern in proximity to the vehicle 102. At step 508, the method 500 may include performing, by the processor 240, the first operation on the first vehicle component (e.g., the rear closure 104) responsive to determining that the vehicle 102 may be operating in the first vehicle operational state. As described above, the first vehicle component may be associated with the first vehicle operational state.

The method 500 may end at step 510.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
- a detection unit comprising at least one sensor configured to receive a position information from a user device in proximity to the vehicle; and
- one or more processors communicatively configured to receive the position information from the detection unit, wherein the processor is configured to:
  - determine that the user device is moving in a predefined pattern in proximity to the vehicle based on the position information;
  - determine that the vehicle is in a first vehicle operational state, of a plurality of vehicle operational states, responsive to determining that the user device is moving in the predefined pattern in proximity to the vehicle; and
  - control a first operation of a first vehicle component based on both the predefined pattern and the first vehicle operational state, such that a same detected pattern results in different control operations depending on the vehicle operational state, wherein the first vehicle component is associated with the first vehicle operational state.

2. The vehicle of claim 1, wherein the user device is a mobile phone, a key fob, a wearable device with an Ultra-wideband (UWB) transceiver or a UWB tag.

3. The vehicle of claim 1, wherein the detection unit comprises one or more UWB transceivers.

4. The vehicle of claim 1, wherein the processor is further configured to:
- authenticate the user device when the user device is in proximity to the vehicle; and
- communicatively couple the user device with the vehicle responsive to authenticating the user device.

5. The vehicle of claim 4, wherein the detection unit is configured to receive the position information when the user device is communicatively coupled with the vehicle.

6. The vehicle of claim 1, wherein the first vehicle component is a rear closure, and wherein the processor determines that the vehicle is in the first vehicle operational state when the rear closure is in an open state.

7. The vehicle of claim 6, wherein the first operation comprises closing the rear closure when the rear closure is in the open state.

8. The vehicle of claim 7, wherein the processor is further configured to:
- determine that the rear closure is in a closed state, responsive to determining that the user device is moving in the predefined pattern;
- monitor a rear closure state for a predefined time duration responsive to determining that the rear closure is in the closed state;
- determine that the rear closure state has changed from the closed state to the open state;
- determine that the user device has moved a predefined distance away from the vehicle based on the position of the user device detected by the detection unit; and
- close the rear closure responsive to determining that the user device has moved the predefined distance away from the vehicle.

9. The vehicle of claim 1, wherein the processor is further configured to:
- determine that the vehicle is in a second vehicle operational state, of the plurality of vehicle operational states, responsive to determining that the user device is moving in the predefined pattern in proximity to the vehicle; and
- perform a second operation on a second vehicle component responsive to determining that the vehicle is in the second vehicle operational state, wherein the second vehicle component is associated with the second vehicle operational state, wherein the second vehicle operational state is different from the first vehicle operational state, and wherein the second vehicle component is different from the first vehicle component.

10. The vehicle of claim 1 further comprising a memory configured to store an information associated with the predefined pattern, wherein the processor is further configured to:
- determine a user device movement pattern based on the position of the user device in proximity to the vehicle detected by the detection unit over a predefined time duration;
- correlate the user device movement pattern with the information associated with the predefined pattern stored in the memory; and
- determine that the user device is moving in the predefined pattern based on the correlation.

11. The vehicle of claim 10, wherein the information associated with the predefined pattern is customizable by a vehicle user.

12. The vehicle of claim 1, wherein the processor determines that the user device is moving in the predefined pattern when the user device repeatedly moves closer to the vehicle and away from the vehicle a predefined count of times over a first preset time duration.

13. The vehicle of claim 1, wherein the processor determines that the user device is moving in the predefined pattern when the user device moves from a first preset position in proximity to the vehicle to a second preset position in proximity to the vehicle, and stays stationary in the second preset position for a second preset time duration.

14. The vehicle of claim 1, wherein the processor is further configured to:
- determine a pattern characteristic associated with a user device movement when the user device moves in the predefined pattern in proximity to the vehicle; and
- perform a third operation on a third vehicle component based on the pattern characteristic.

15. The vehicle of claim 14, wherein the pattern characteristic comprises an operating state of a vehicle component closest to the user device when the user device moves in the predefined pattern, and wherein the third vehicle component is the vehicle component closest to the user device when the user device moves in the predefined pattern.

16. The vehicle of claim 14, wherein the pattern characteristic comprises an operating state of a vehicle component towards which the user device is pointed when the user device moves in the predefined pattern, and wherein the third vehicle component is the vehicle component towards which the user device is pointed when the user device moves in the predefined pattern.

17. The vehicle of claim 1, wherein the processor is further configured to:
- determine that the vehicle is in a third vehicle operational state, responsive to determining that the user device is moving in the predefined pattern in proximity to the vehicle;

obtain an information associated with the third vehicle operational state responsive to determining that the vehicle is operating in the third vehicle operational state;

determine a fourth vehicle component based on the information associated with the third vehicle operational state; and control an operation of the first vehicle component simultaneously with an operation of the fourth vehicle component responsive to determining the fourth vehicle component.

18. A method to control an operation of a first vehicle component, the method comprising:

determining, by a processor, that a user device is moving in a predefined pattern in proximity to a vehicle based on a position information associated with the user device received by a detection unit comprising at least one sensor;

determining, by the processor, that the vehicle is in a first vehicle operational state, of a plurality of vehicle operational states, responsive to determining that the user device is moving in the predefined pattern in proximity to the vehicle; and controlling, by the processor, a first operation of the first vehicle component based on both the predefined pattern and the first vehicle operational state, such that a same detected pattern results in different control operations depending on the vehicle operational state, wherein the first vehicle component is associated with the first vehicle operational state.

19. The method of claim 18, wherein the detection unit comprises one or more UWB transceivers.

20. A non-transitory computer-readable storage medium having instructions stored thereupon which, when executed by a processor, cause the processor to:

determine that a user device is moving in a predefined pattern in proximity to a vehicle based on a position information associated with the user device received by a detection unit comprising at least one sensor;

determine that the vehicle is in a first vehicle operational state, of a plurality of vehicle operational states, responsive to determining that the user device is moving in the predefined pattern in proximity to the vehicle; and control a first operation of a first vehicle component based on both the predefined pattern and the first vehicle operational state, such that a same detected pattern results in different control operations depending on the vehicle operational state, wherein the first vehicle component is associated with the first vehicle operational state.

* * * * *